US009132691B2

(12) United States Patent
Hirsch et al.

(10) Patent No.: US 9,132,691 B2
(45) Date of Patent: Sep. 15, 2015

(54) MASS CUSTOMIZATION OF ARTICLES HAVING DIMENSIONAL AND/OR ANIMATED IMAGES

(75) Inventors: Daniel S. Hirsch, Savage, MN (US); David M. Gilbert, Minneapolis, MN (US); John Tomczyk, Shoreview, MN (US); Anthony L. Hoffman, Eagan, MN (US)

(73) Assignee: Travel Tags, Inc., North Mankato, MN (US)

( * ) Notice: Subject to any disclaimer, the term of this patent is extended or adjusted under 35 U.S.C. 154(b) by 432 days.

(21) Appl. No.: 13/231,387

(22) Filed: Sep. 13, 2011

(65) Prior Publication Data

US 2012/0062917 A1 Mar. 15, 2012

Related U.S. Application Data

(60) Provisional application No. 61/382,213, filed on Sep. 13, 2010.

(51) Int. Cl.
*H04N 1/46* (2006.01)
*B42D 15/02* (2006.01)

(52) U.S. Cl.
CPC .......... *B42D 15/027* (2013.01); *B42D 2035/20* (2013.01)

(58) Field of Classification Search
None
See application file for complete search history.

(56) References Cited

U.S. PATENT DOCUMENTS 5,695,346 A * 12/1997 Sekiguchi et al. ............ 434/365
6,026,215 A * 2/2000 Fantone et al. ................ 358/1.2
6,366,407 B2 * 4/2002 Rivera et al. .................. 359/619
6,424,467 B1 7/2002 Goggins
6,817,530 B2 * 11/2004 Labrec et al. ................. 235/487
6,900,944 B2 * 5/2005 Tomczyk ...................... 359/619
7,149,035 B2 * 12/2006 Goggins ........................ 359/619
7,359,120 B1 * 4/2008 Raymond et al. ............. 359/626
7,545,568 B2 * 6/2009 Raymond et al. ............. 359/619
8,056,929 B2 11/2011 Hoffman et al.
8,253,780 B2 * 8/2012 Raymond et al. ............... 348/51
2002/0113757 A1 * 8/2002 Hoisko ............................ 345/8
2007/0009716 A1 * 1/2007 Crum ............................ 428/204
2007/0156837 A1 * 7/2007 Elgar et al. .................... 709/208

(Continued)

FOREIGN PATENT DOCUMENTS

JP 2001-255606 * 9/2001 ............. G03B 35/00

OTHER PUBLICATIONS

Fujifilm Introducing 3D Digital Camera and Printing System in 2Q 2010, Feb. 18, 2010, 1 page.

(Continued)

*Primary Examiner* — Dung Tran
(74) *Attorney, Agent, or Firm* — Patterson Thuente Pedersen, P.A.

(57) ABSTRACT

Mass customization of articles with a customized composite or dimensional image created from one or more custom images, such as photographs, text, and the like. The customized composite image is automatically generated by interlacing, or otherwise combining, the one or more custom or personalized images, and is automatically placed or imposed in a digital template to form a print ready file. The print file is then digitally printed on a substrate and a lens is married thereto such that the composite image is viewable through the lens. Alternatively, the print ready file, or at least the customized composite image, is printed directly on the back of a lens such that the composite image is viewable through the lens.

31 Claims, 8 Drawing Sheets

(56) References Cited

U.S. PATENT DOCUMENTS

| | | | |
|---|---|---|---|
| 2007/0268523 A1* | 11/2007 | Ferrara et al. | 358/1.18 |
| 2008/0088126 A1 | 4/2008 | Hoffman et al. | |
| 2008/0088931 A1 | 4/2008 | Hoffman et al. | |
| 2008/0213528 A1 | 9/2008 | Hoffman et al. | |
| 2009/0213210 A1* | 8/2009 | Conley | 348/59 |
| 2010/0046022 A1* | 2/2010 | Phelan et al. | 358/1.14 |
| 2010/0134895 A1* | 6/2010 | Hoffman et al. | 359/621 |
| 2010/0247757 A1* | 9/2010 | Inoue | 427/162 |
| 2011/0000967 A1* | 1/2011 | Labrec et al. | 235/488 |
| 2011/0013286 A1* | 1/2011 | Chen et al. | 359/619 |
| 2012/0087013 A1* | 4/2012 | Liu et al. | 359/628 |
| 2012/0140333 A1 | 6/2012 | Tomczyk et al. | |
| 2012/0273576 A1 | 11/2012 | Tomczyk et al. | |
| 2013/0258410 A1* | 10/2013 | Shirotori | 358/1.18 |

OTHER PUBLICATIONS

Xante Ilumina 3D printer prototype, known to applicant at least as of Jan. 3, 2012, 2 pages.

Svp DC-3D-80 Black 3D Digital Camera, known to applicant at least as of Dec. 16, 2011, 1 page.

Fujifilm 3D Print System, known to applicant at least as of Jan. 3, 2012, 2 pages.

MGI 3D printer prototype, known to applicant at least as of Jan. 3, 2012, 1 page.

* cited by examiner

MASS CUSTOMIZATION OF ARTICLES HAVING DIMENSIONAL AND/OR ANIMATED IMAGES

RELATED APPLICATION

The present application claims the benefit of U.S. Provisional Application No. 61/382,213 filed Sep. 13, 2010, which is incorporated herein in its entirety by reference.

FIELD OF THE INVENTION

The invention relates generally to mass customization of articles, and more particularly to the production of articles having one or more customized composite images.

BACKGROUND OF THE INVENTION

Dimensional or animation imaging techniques and devices are used to create special visual effects such as, for example, 3D effects, animation, depth, magnification, morph, and other such types of graphics on an article. For simplicity, these specialized visual effects will be generally referred to as "dimensional" imaging throughout, and are not limited to any one of the effects described above. The dimensional image can be applied to various articles as eye-catching promotional tools, advertising, branding, games, and the like because the dimensional images offer eye-catching images by providing multiple images and/or animation. Examples of articles can include, for example, containers, cups, packaging, wrappers, tubes, envelopes, announcements, portfolios, multimedia packaging, portfolios, folders, greeting cards, invitations, napkins, posters, business cards, fabrics and clothing, billboards, stickers, labels, badges, pens, magnets, postcards, transaction cards such as gift cards, loyalty cards, reward cards, phone cards, and identification cards, and any of a variety of articles.

Dimensional image display devices typically incorporate a printed image proximate a lens array. The printed image can be either directly bonded to or printed on to the lens array, or printed on a separate substrate and laminated to the lens array. Image segments or elements are printed using high resolution, and precise registration techniques to form the overall image. One such printing technique includes interlacing images, in which a composite of two or more images are interlaced with each other in individual slices or segments to form the overall image that will be viewed through a lens array. The interlaced image is then configured or mapped so that each lens of the array focuses on at least a portion of the interlaced image. The interlaced image is configured to accommodate both viewing distance and curvature through the lens.

One type of dimensional imaging technology well-known in the art includes lenticular image technology. Lenticular image technology includes a lenticular image, such as an interlaced image, in combination with a lenticular lens array. The lenticular lens array is formed from a web or sheet including a plurality of substantially parallel elongated cylindrical lenticules or lenses on one surface. The second surface is planar. Typically, the lenticular lens array is formed from a plastic material and can be formed from any of a variety of techniques including casting, coating, embossing, extruding, and the like. The lens array can be a full lenticular pattern or can be spot array, i.e. covering only portions of the surface. The interlaced image can be printed directly on the planar second surface, or can be printed on a separate substrate and subsequently laminated to the lenticular lens array by a clear adhesive, fusing, or other similar techniques. Examples of lenticular image technology can be found in U.S. Pat. Nos. 6,900,944 to Tomczyk; 6,424,467 to Goggins; and 7,359,120 to Raymond et al., the disclosures of which are incorporated herein by reference.

Another type of dimensional imaging technology includes fly's eye or bug's eye image technology. Fly's eye or "integral" lens arrays are formed from a web or sheet including a plurality of domes or semi-circular structures, rather than the elongated lenses of lenticular technology. The lens array can be a full fly's eye pattern or can be spot array, i.e. covering only portions of the surface. Similar to lenticular technology, an image, such as an interlaced image, can be printed on the planar side of the lens sheet or web, or printed on a separate substrate and laminated thereto. There are a number of benefits to using a fly's eye lens as opposed to a lenticular lens. The fly's eye lens is essentially a lens that allows viewing in multiple directions tangentially around the lens. This essentially allows one not only to interlace an image from left to right (horizontal direction), but also up and down (vertical direction), diagonally, or any combination thereof to give additional animated, dimensional, or other visual effects.

Creation of articles having these special visual effects via dimensional images is typically accomplished through time intensive methods because of the amount of manual editing and input that goes into interlacing the images, and formatting the final file to be printed. Typically, a production facility receives an order from a customer, manually creates the composite interlaced image, prints a physical, hard-copy proof, sends the proof to the customer, makes an edits to the proof, possibly resends the proof, and finally prints the order upon approval of the proof. The entire order process can take several days, if not weeks, before the order is complete. The process, as it is labor intensive, can also be very expensive. For example, large costs are incurred because it is time consuming to produce hundreds or even thousands of unique pieces with each individual piece being "touched" or otherwise manipulated manually.

Furthermore, because of the time and expense associated with creating the dimensionally imaged articles in the traditional manner, mass customization of dimensionally imaged or lenticular articles is often limited to businesses with large advertising budgets and is often not available to individual customers. Customers cannot purchase inexpensive articles that include a customized lenticular or composite image incorporated into the article.

There remains a need for systems and methods to quickly and efficiently produce mass customization of lenticular or otherwise dimensionally imaged articles.

SUMMARY OF THE INVENTION

Embodiments of the invention are directed to the mass customization of articles with a customized composite or dimensional image created from one or more custom images, such as photographs, text, graphics, and the like. The customized composite image is automatically generated by combining, such as by interlacing, of the one or more custom or personalized images, and is automatically placed in a digital template to form a print ready file. The print file is then digitally printed on a substrate and a lens is married thereto such that the composite image is viewable through the lens. Alternatively, the print ready file, or at least the customized composite image, is printed directly on the back of a lens such that the composite image is viewable through the lens.

In one embodiment of the invention, a user creates an order for one or more customized dimensionally imaged articles via a user interface accessible on the user's device. The user accesses the user interface through a host site available on the Internet, through a custom mobile application, or other network. The user selects a digital template from a plurality of templates available for viewing on the host site, or creates a template from scratch. The user then uploads one or more data files in digital format, the data files including photographs, graphics, logos, text, or any of a variety of digital files. In one embodiment the data file is an image file.

Optionally, the host site or custom application generates a digital proof or graphical representation of the customized composite image to be incorporated into the template. In one embodiment, the digital proof includes a graphical representation of the customized composite image inserted into the template. The user is able to edit and crop the composite image and/or one or more of the uploaded data files until the digital proof is acceptable to the user. The user then approves the digital proof and submits an order for one or more articles with the customized composite image. The details of the order, including the data files, optionally in compressed format, the template selection or creation, shipping and/or payment information, is then transmitted over the network to a production site. An automated confirmation of the order is then returned to the user electronically.

On the back end, a production or manufacturing site receives the order information. Upon receipt, the data files, if originally compressed upon submission of the order, are automatically uncompressed and combined, such as by interlacing, optionally with one or more additional images, to form the final composite interlaced image. Optionally, if the template used is the full width and height of the finished piece, and two uploaded images make up the entire piece, no other image is needed to be combined. In one particular embodiment, the final composite image comprises alternating segments or slices of each of the data files. The final composite image is then automatically or manually imposed as a print-ready file using an imposition program by the production site using, for example, a coordinate system in which each pixel of the composite image is assigned to an x-y coordinate of the template, determined by the selection or creation of the template. The template with customized composite image is saved as a print-ready file.

The print ready file is then communicated to, such as by over a network or communications bus, and printed by a digital printing engine with print head onto a substrate, such as sheet stock or web. The print ready file is printed repeatedly depending on the quantity of articles ordered. Additionally, the opposite side of the substrate, i.e. the side without the composite image, can be digitally printed with static and/or variable text, graphics, logos, and any of a variety of indicia. After printing, the sheet stock or web is married to a lens material such that the lenses are aligned or precisely registered with the interlaced images and the customized composite image is viewable through the lens. Alternatively, the print ready file, or at least the customized composite image, is printed directly on the back of a lens material such that the lenses are aligned or precisely registered with the interlaced images and composite image is viewable through the lens.

The sheet stock or web with lens is then converted, including lamination and/or cutting, and stacked thereby forming a plurality of articles, such as a stack of invitations or cards. The article(s) are then packaged, and shipping information automatically read from the order information is printed onto a label and placed on the package, or alternatively incorporated into one or more of the order pieces and packaged so that the information is viewable through the package. The order is complete upon shipping of the package. Preferably, the order is completed within three days or less of submission of the order.

In an alternative embodiment of the invention, a user supplies one or more digital data files to the production site, either through a user interface or some other means such as email, mail, a storage device such as a flash drive or writable CD, and the like. The digital data file can comprise, for example, a database including a variable data set, or a series of elements activated by logic to determine whether a particular element should be included in the creation of the customized articles. In one particular embodiment, the digital data file comprises a database including a list of targeted recipients for mass distribution of a mail piece. Upon receipt of the digital data file, each piece or at least some of the pieces of data particular to a recipient from the file is automatically converted to an image file, a text file, or a text string. For example, each name in a database of names is converted to a custom text string.

Each custom text string or image file is then automatically combined with one or more images, such as by interlacing with either a stock graphic or other image, to create a composite image. The composite image is inserted into a field of a template, such as a postcard template, and is then optionally saved as a graphic animating file. Alternatively, each name, in the form of a text string, is imposed or inserted between a "louvered" or transparent interlaced file and another phase absent or displaced from the transparent interlaced file. The text or font is kept in traditional format, i.e. not an image file, so as to keep the files small and process very fast.

Each graphic animating file is then sent to the print device to be individually printed, or combined into a larger file to be printed on a substrate, such as sheet stock or a web. Additionally, the opposite side of the substrate, i.e. the side without the composite image, can be digitally printed with static and/or variable text, graphics, logos, and any of a variety of indicia. After printing, the sheet stock or web is married to a lens array such that the lenses are aligned or precisely registered with the interlaced images and the customized composite image is viewable through the lens. Alternatively, the print ready file, or at least the customized composite image, is printed directly on the back of a lens such that the lenses are aligned or precisely registered with the composite image such that the composite image is viewable through the lens array. Additionally, the printed lens can be laminated with an opaque paper or polymer backing and further back printed. The web or lens is then converted into a final mailing piece. The final mailing piece is then mailed or shipped according to the customer information from the original data file.

The embodiments of the present invention preferably involve little to no operator interaction from the order submission to the printing of the print ready file, in which the interlacing and layout are done automatically by a computer system.

The above summary of the invention is not intended to describe each illustrated embodiment or every implementation of the present invention. The figures and the detailed description that follow more particularly exemplify these embodiments.

Figure 1:
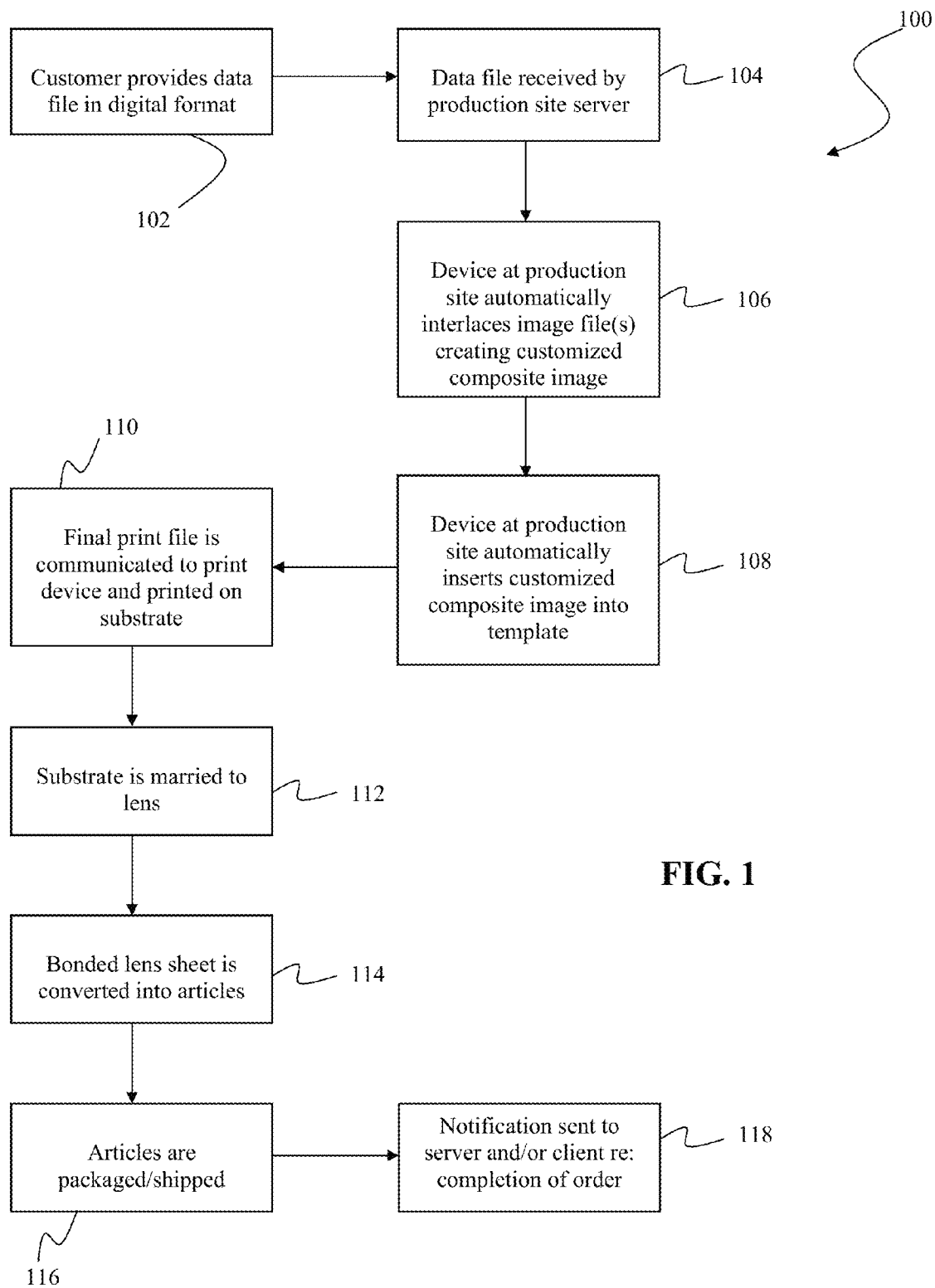
FIG. 1 is a flow diagram of a mass customization method according to an embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

The embodiments of the present invention allow mass customization of articles that exhibit special visual effects that are eye-catching and aesthetically pleasing. "Dimensional imaging" or "dimensionally imaged" in this application refers generally to a special visual effect, such as 3D, depth effect, holographic effect, animation, magnification, flip or morphing effects, and the like or combinations thereof. The special visual effect is accomplished via computerized imaging techniques, such as, but not limited to, interlacing techniques in which segments or slices from each image are alternated or angularly separated so that a different image is seen from different perspectives, coupled with a lens array, such as a lenticular lens, fly's eye lens, or any of a variety of suitable lens arrays and combinations thereof. The lens array can be a full fly's eye pattern or can be spot array, i.e. covering only portions of the surface.

The interlacing of one or more images is a function of the characteristics of the lens array, such as the shape, pitch, and the like. For the purpose of the examples, lenticular lenses coupled with interlaced images are referred to; however, it is within the scope of the invention that any of a variety of imaging techniques coupled with the appropriate lenses can be used. Alternative imaging techniques can include, a one-color animation technique, hologravure technique, bi-directional interlacing, or combinations thereof, used in combination with lenticular lenses, spot lenticular lenses (as described in U.S. patent application Ser. No. 13/229,116 entitled "Lens Sheet Having Lens Array Formed in Pre-Selected Areas and Articles Formed Therefrom," incorporated herein by reference in its entirety), fly's eye lenses, or any of a variety of lenses or combinations thereof. In one embodiment, one-color animation is used. A one-color animation technique includes designing a dimensional image to get a desired dimensional effect by building the animation images from only one color which overprints other colors of a color process, such as a 4-CP separation. The advantage of one-color animation is that it is not necessary to have the colors in precise ink-to-ink registration. The animation will always be viewable and give high-quality dimension effect regardless of the register of the other colors. Because of the elimination or reduction of the need for critical ink-to-ink registration accuracy, web press printing with registration tolerances less than sheet fed press tolerances becomes a viable manufacturing option without compromising image quality.

Hologravure-type images, known by the trade name Infinidepth, are similar to one-color animations in that the animating effect is typically incorporated in one-color of a color process, such as a 4-CP separation. However, hologravure techniques incorporate a holographic fringe pattern that gives a depth or 3D effect to the image, either in combination to the animation produced from one-color animation, or alone. The hologravure technique is set forth in a series of currently pending patent applications including U.S. Application Publication Nos. 2008/0088126 entitled "Layered Image Display Applications and Methods," 2008/0088931 entitled "Layered Image Display Sheet," and 2008/0213528 entitled "Customized Printing with Depth Effect" all of which are incorporated herein by reference in their entireties.

Referring to FIG. 1, a general flow diagram illustrates a method of mass customization 100 generally includes providing a file in digital format 102, the file including data particular to a customer. The digital file can comprise an image file, a text file, a database, a spreadsheet, and the like, such as, for example, a JPEG, GIFF, PDF, DOC, XLS, or ZIP. In one embodiment, the customer provides one or more image files including digital photographs, scanned photographs, graphics, text, stock images, or combinations thereof.

The one or more customer files are received by and stored on a server at production site at 104. A device, such as a computer with a central processing unit (CPU), at the production site automatically identifies the one or more files to be converted to a composite interlaced image, and automatically interlaces the one or more files at 106 thereby forming a customized composite interlaced image. The composite interlaced image is defined as an image that comprises alternating segments or slices of two or more images. For example, the customized composite image can comprise an interlaced composite of the customer file, such as a photo, with a stock photo stored on the production site server, or can comprise a composite of two or more customer files, such as two customer photos, or a composite of an image file representing customized text with either a stock photo or background, or a customer photo or background. The customized composite image is then saved as a customized composite image file in digital format. As discussed previously, other imaging techniques, such as Infinidepth®, can be used to form the customized composite image in place of or in combination with traditional interlacing.

The interlacing is performed according to pre-entered parameters, such as the type of desired effect, i.e. 3D, animation, morph, flip, etc., the type of lens, i.e. lenticular vs. fly's eye, the direction of animation if animation is desired, i.e. side-to-side, up-down, corner-to-corner, etc., the pitch of the lens, and other such parameters. These parameters can be selected by the customer or other user on the front end at the time of order placement using a customer interface, or a user on the back end, such as an operator, file modifier, or the like.

Once the customized composite image is formed in 106, it is then automatically inserted at 108 into a field of either a predetermined digital template or a digital template selected by the customer, i.e. it is automatically imposed into a print-ready file using an imposition program. The digital template can comprise any of a number of articles such as invitations, greeting cards, announcements, business cards, portfolios, adhesive notepads, napkins, stationery, postcards, folders, labels, magnets, key chains, cups or containers, and can comprise any of a number themes, such as birthday, wedding, save-the-date, bar mitzvah or bah mitzvah, holiday, birth, sports, graduation, and any of a variety of themes. In an alternative embodiment of the invention, the template can be built from scratch by the customer on a user interface.

Any of the templates, whether built from scratch or predefined, comprises a field for insertion of the customized composite image, defined by x-y coordinates. For example, each pixel of the customized composite image is assigned to an x-y coordinate on the template, such that the site automatically inserts the individual pixels into their respective coordinates on the digital template such that little to no operator intervention is required. In one embodiment of the invention, the template is a PDF format with a placeholder file in the field, wherein the customized composite image replaces the placeholder file.

It is also contemplated that the template can comprise more than one field in which multiple customized composite images can be inserted. Once the customized composite image is imposed into the digital template, the combination is automatically saved as a form file in a suitable format, such as a JPEG, GIFF, PDF, or the like. This form file is then automatically converted to a page description language (PDL), for example, by sending it through a raster image processor (RIP) to generate a print ready file in digital format that can be accepted by a print device or print engine. Other PDLs can be contemplated, such as, for example, PCL (printer control language) and HPGL (Hewlett-Packard Graphics Language). Alternatively, certain print devices do not require this conversion to a RIP or other PDL file and are print-ready without the conversion.

The final print digital file is then communicated to a print device at 110. In one embodiment, it is automatically routed to a factory interface and entered into the queue for printing. An operator selects a batch of print ready files from a terminal and sends it to the print device through a communication bus. The print device generally comprises a digital print device, such as, for example, toner based devices such as Xerox devices including desktop sheet fed devices, a UV toner device such as a roll-fed devices available from Xeikon, inkjet devices such as a conventional inkjet printer including Epson desk top printers, and UV inkjet devices, drop on demand devices, laser imaging devices, thermal imaging devices, or any of a variety of digital printers utilizing inks, toners, and printing techniques, such as a four-color process. The print ready file is then printed on a substrate, such as sheet stock, a web, card stock, or directly onto a lens. Additionally, the opposite side of the substrate, i.e. the side without the composite image, can be digitally printed with static and/or variable text, graphics, logos, and any of a variety of indicia. In the case of printing directly on the lens, an opaque backing can optionally be placed over the dimensional image printed directly to the lens before back printing.

The printed sheets or rolled web, if not printed directly on a lens, is then laminated or otherwise mounted to an unprinted lens at 112, such that the customized composite image is viewable through the lens and the desired effect is achieved. The lens is registered to the printed substrate using registration techniques known to one of ordinary skill in the art.

The mounting can be accomplished by any of a variety of nipping, compression and heat lamination, cold lamination, or any of a variety of lamination techniques. Any of a variety of adhesives can be used such as radiation curable or cured adhesives such as UV-curable or UV-cured adhesive, moisture cure adhesives, two-part adhesives such as urethanes and epoxies, pressure-sensitive adhesives, two-part moisture cure urethanes, water-based adhesives, solvent-based adhesives, thermally activated or thermally cured adhesives, and combinations thereof.

The bonded printed sheets then continue to optional converting 114. For example, if multiple print files are printed on the substrate, the substrate is converted into a plurality of articles. Similarly, if multiple print batches are printed on a single substrate, the substrate is converted. Any of a number of suitable converting techniques can be utilized, such as, for example, guillotine, rotary converting, laser converting, steel rule die cutting, punch press, and the like.

The information on each piece within an order can vary from piece to piece, or can be the same within the order. Additionally or alternatively, the information can vary from order to order, or can be the same between orders.

Optionally machine-readable or human-readable indicia, such as a magnetic stripe, barcode, 2D barcode, QR code, alphanumeric code, or combinations thereof can be applied to the front and/or back of the article, either before or after converting. An optional protective backing or coating can then be applied over the machine- or human-readable indicia, such as described in U.S. Provisional Application No. 61/480, 213, entitled "Articles having machine or Human Readable Indicia Imaged Under a Tamper Proof Layer for Theft Prevention," incorporated herein by reference in its entirety.

The converted articles or pieces are then optionally stacked and packaged for shipping per order at 116. In one embodiment of the invention, a camera reads a machine-readable code indicative of the shipping information off of the package, and a shipping label with postage is printed and affixed to package.

A message or file is then automatically and electronically sent to the server indicating that the print project, and therefore the order is complete at 118. Optionally, an electronic email is sent to client with ship information and tracking number. In one embodiment of the invention, the entire method 100 is completed within three days or less.

Online Customer Ordering

Figure 2:
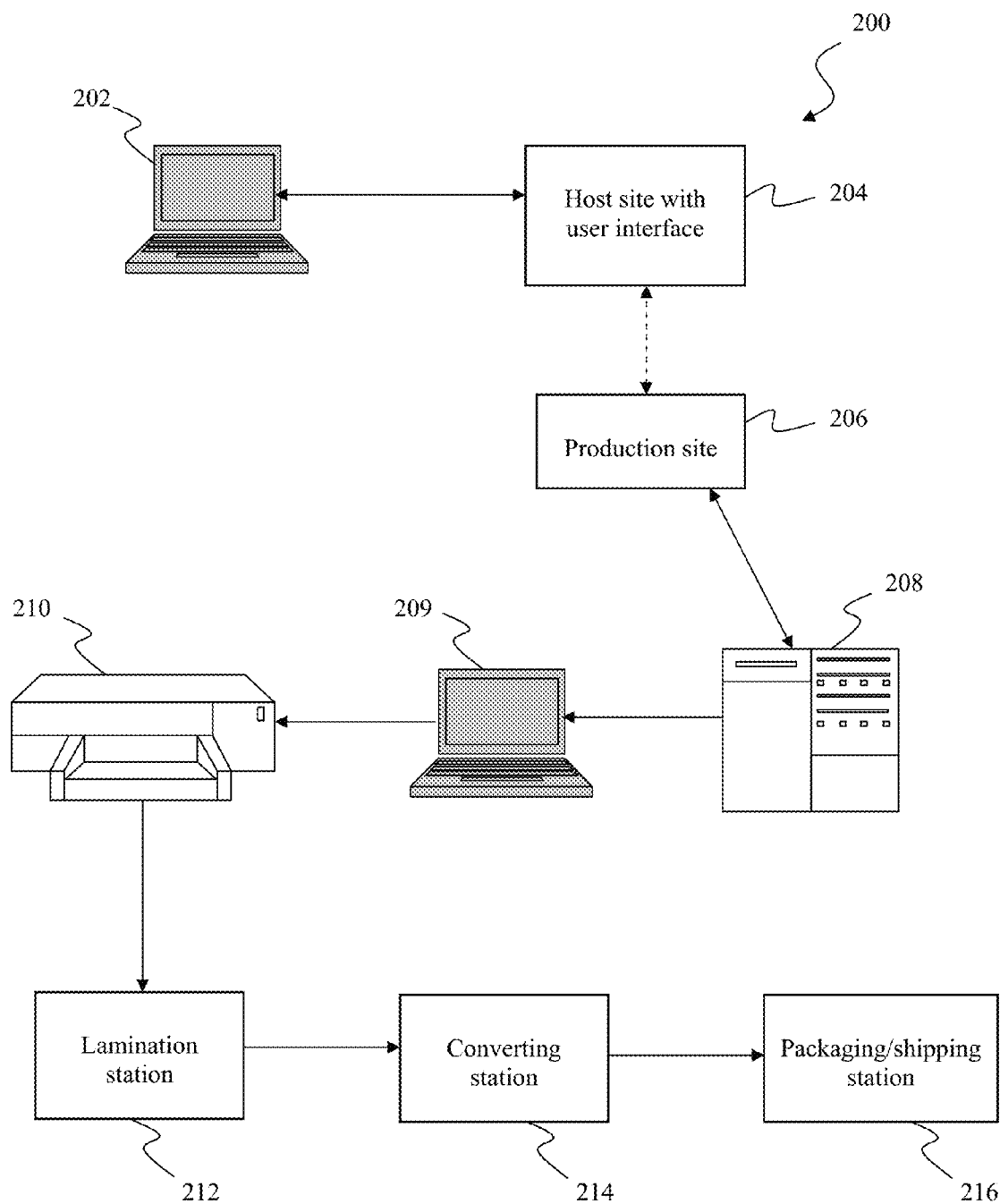
FIG. 2 is a block diagram of a mass customization system according to an embodiment of the invention.

In one embodiment of the invention, and referring to FIG. 2, a system 200 of mass customization generally includes a user device 202, a host site or custom mobile application 204, a production site 206 including a server 208, a print station 210, a lamination station 212, an optional converting station 214, and a shipping station 216.

A customer or user accesses host site 204 via a user device 202, such as a personal or business computer, kiosk computer, or a hand-held device. Host site 204 is available through a network, such as the Internet or a local area network (LAN), and is in communication with server 208 at production site 206. Host site 204 is accessible by the user via a website on a browser.

Host site 204 generally comprises a user interface, such as through Adobe Creative Suite or Jigsaw, in which the user or customer can enter order information into fields via a mouse, keyboard, touch-screen, track pad, track ball, voice recognition, or any of a variety of controllers. Host site 204 provides a customer or user with a plurality of predesigned digital templates of a variety of layouts and themes. Each template includes one or more fields for insertion of a customized composite image. The templates can also include a variety of pre-designated fields so that the user can optionally add personalized static graphics or text on the front and/or back of the template. In the case of text, the user can choose the font, color, spacing, and/or size of the text. In another embodiment, the text can be placed anywhere on the template by the user. Alternatively, the customer can design their own template via the user interface using a variety of graphics (either stock or customer provided), text, colors, and the like.

The user is prompted on the user interface to upload one or more data files in digital format. The files can be in any format including positive image formats such as JPEG, PDF, TIFF, RGB, CMYK, or digital negatives such as raw image files. For example, the customer can provide two personal image files, such as digital pictures or scanned photographs. In a particular example, the user selects a save-the-date template for a wedding, and uploads a digital picture of each of the bride-to-be and the groom-to-be. In another embodiment of the invention, the user uploads a single image file, and selects a stock image to be combined with the image file. In yet another embodiment of the invention, the image file comprises text.

The user has the option through the interface to crop one or more of the image files to fit the template to their satisfaction. Other editing tools can also be contemplated such as image brightness, contrast, effect (for example, print toning such as sepia tone or black and white), and the like.

Once all of the information from the user has been captured, the user prompts the host site to create a digital proof of the overall product, or of only the customized composite image. The host site automatically creates a digital representation, such as an animated gif file, of the customized composite image, either alone or set in the template. The user then has the option to edit the customized composite image and/or template in which the digital proof is then updated until the user is satisfied. The user then accepts the digital proof.

Other order information such as quantity, shipping, and payment information is entered into the user interface. The user then submits the order. An automatic order confirmation is then sent to the user electronically.

Upon submission of the order, the order details, such as template selection, data or image files, quantity, shipping, and payment selection, are automatically communicated or transmitted over the network to server 208 at production site 206. In one embodiment of the invention, the data files are optionally compressed using a known compression technique, such as lossy compression, in which some data is lost (JPEG or MPEG), or non-lossy or lossless compression in which almost no data is lost. This allows the information making up the image file to be compressed into a "shorthand" notation to reduce the size of the file without compromising the resolution. Combination of compression and non-compression techniques can be used such as by the use of common file tags (TIFF). Other compression techniques known to those of ordinary skill in the art can be contemplated, as well as any combination of compressed and uncompressed files can be contemplated.

Once the information is received by server 208 at production site 206, the files are "uncompressed" to "longhand" form, if originally compressed, such that their original resolution is at least partly available, via a CPU of a computer 209. Suitable desktop publishing software to be used at production site 206 can include, for example, Adobe InDesign®, XMPie uDirect, or any of an unlimited variety of desktop publishing software.

The one or more files are automatically interlaced, as described above. In one embodiment of the invention, a file size of the customized composite image is greater than the file size of each individual compressed file. As discussed previously, other imaging techniques, such as Infinidepth® can be used to form the customized composite image in place of or in combination with traditional interlacing.

The customized composite image is then automatically inserted into the pre-designated field of the digital template selected or created by the customer, i.e. the composite image is imposed into a print-ready file using methods as described above. Preferably, the customized composite image closely resembles the digital proof approved earlier the by the user. Once the customized composite image is inserted into the digital template, the combination is automatically saved as a form file in a suitable format, such as a JPEG, GIFF, PDF, or the like. This form file is then automatically converted to a page description language (PDL), for example, by sending through a raster image processor (RIP) to generate a print ready file in digital format that can be accepted by a print device. Other PDLs can be contemplated, such as, for example, PCL (printer control language) and HPGL (graphics file extension). Alternatively, certain print devices do not require this conversion to a RIP or other PDL file and are print-ready without the conversion.

The print ready file is then communicated to one or more print devices at print station 210 and is entered into the queue for printing. An operator selects a batch of print ready files from a terminal and sends it to the print device through a communication bus. The print device generally comprises a digital print engine, such as, for example, an inkjet, drop on demand, laser, or any of a variety of digital printers utilizing inks, toners, and printing techniques, such as a four-color process. The print ready file is then printed on a substrate, such as sheet stock, a web, card stock, or directly onto a lens. Additionally, the opposite side of the substrate, i.e. the side without the composite image, can be digitally printed with static and/or variable text, graphics, logos, and any of a variety of indicia.

The printed sheets or rolled web, if not printed directly on a lens, is then bonded, laminated or otherwise mounted to an unprinted lens at lamination station 212, such that the customized composite image is viewable through the lens and the desired effect is achieved. The lens is registered to the printed substrate using registration techniques known to one of ordinary skill in the art. Lamination station 212 can be either a separate station from print station 210 or inline with print station 210. The mounting can be accomplished by any of a variety of nipping, compression and heat lamination, cold lamination, or any of a variety of lamination techniques as described above.

The bonded printed sheets then continue to optional converting station 214. For example, if multiple print files are printed on the substrate, the substrate is converted into a plurality of articles. Similarly, if multiple print batches are printed on a single substrate, the substrate is converted. Any of a number of suitable converting techniques can be utilized, such as, for example, guillotine, rotary converting, laser converting, and the like.

Optionally machine-readable or human-readable indicia, such as a magnetic stripe, barcode, QR code, alphanumeric code can be applied to the front and/or back of the article, either before or after converting.

The converted articles or pieces are then optionally stacked and packaged for shipping at packaging and shipping station 216. In one embodiment of the invention, a camera reads a machine-readable code indicative of the shipping information off of the package, and a shipping label with postage is printed and affixed to package. A message or file is then automatically and electronically sent to the server indicating that the print project, and therefore the order is complete. Optionally, an electronic email is sent to user or posted on the host site with shipping information and a tracking number.

Figure 3:
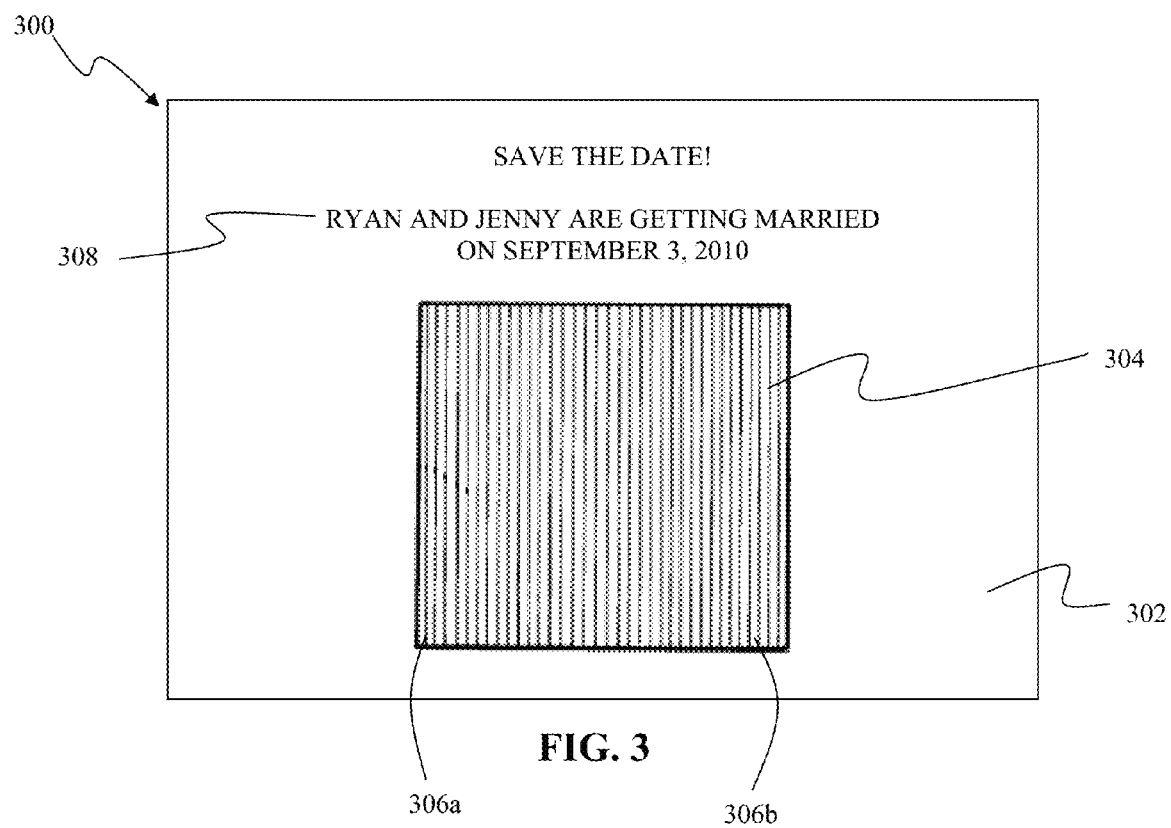
FIG. 3 is a plan view of a customized lenticular article created using the system of FIG. 2.

A customized lenticular article made using the system of FIG. 2, is illustrated in FIG. 3. Article 300 comprises a background template 302 having one or more customized composite images 304 including, for example, an interlaced segments of first personalized image 306a and a second either personalized or stock image 306b. It is also contemplated that more than two images can be interlaced. Background template 302 can be either of a static design, or can contain predefined dimensionally imaged effects, such as animation, 3D text, graphics, and/or logos, and the like.

Article 300 can further comprise personalized static text or graphics 308 placed either in pre-designated fields or anywhere on front and/or back of template 302, and can optionally be placed in a front template so that the text can be placed over at least a portion of customized composite image 304.

Customized Mass Mailing Pieces

The embodiment described above is where an individual user creates their personalized image and/or text. However, it may be desired for an individual or company to create a mass mailing using a database, or other text file, of names and/or addresses to vary the text on the animating or dimensionally imaged side of the mail piece, such as a customized dimensionally imaged post card.

Figure 4:
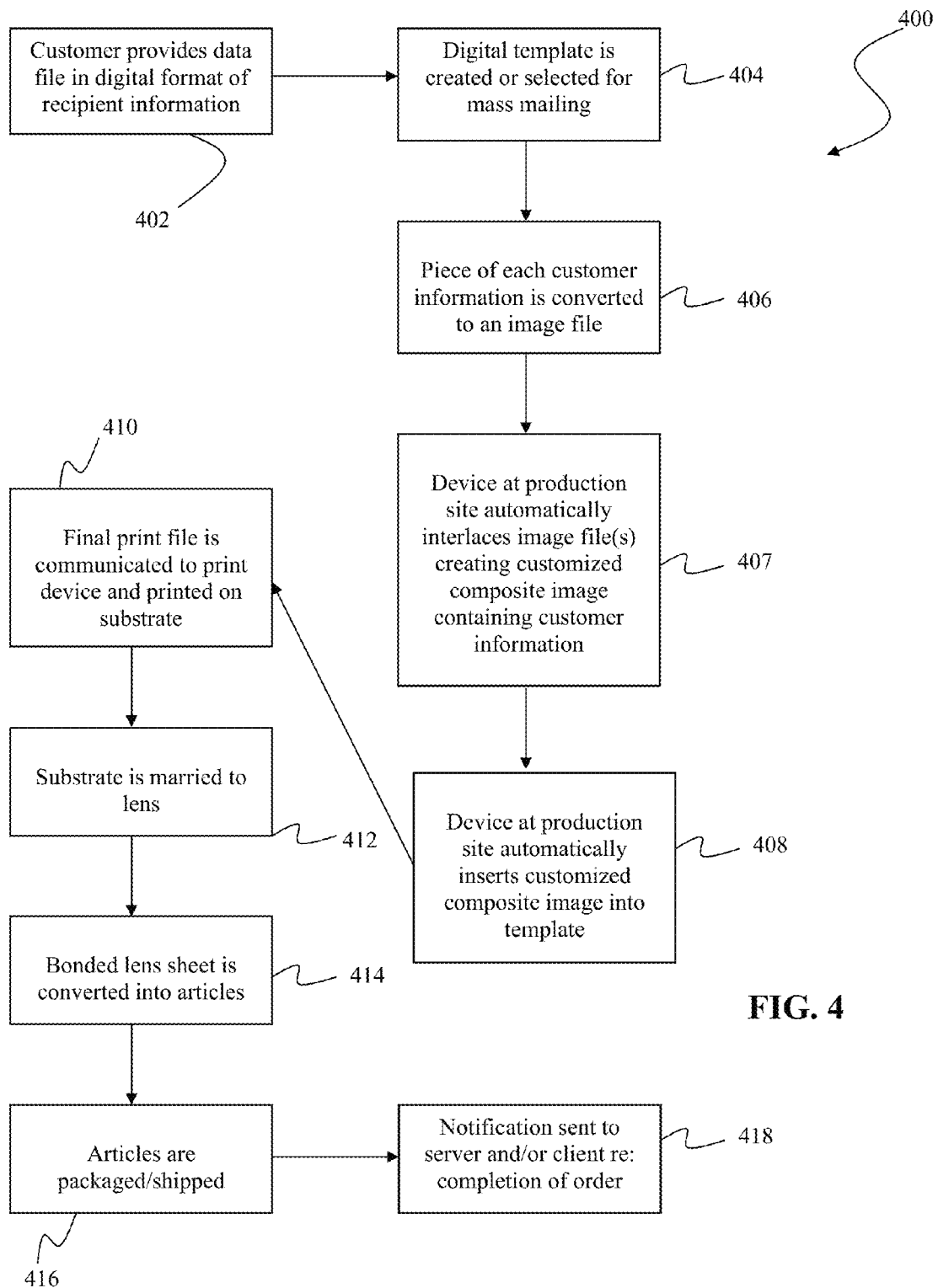
FIG. 4 is a flow diagram of a mass customization method according to another embodiment of the invention.

Referring to method 400 of FIG. 4, a customer, either an individual or company, provides a digital file at 402 of any format, such as a database, list, elements activated by logic, or spreadsheet, of multiple customer or target customer information including, but not limited to names and addresses.

A digital template is created or selected at 404. The digital template includes a layered template with one or more fields for inserting text or other information specific to each customer, such as a name and address. At least a portion of the customer information, such as the name of each customer is automatically converted to and saved as an image file at 406, such as a JPEG or GIFF file. This customized image file is then automatically interlaced 407 with one or more stock image files such as graphics, text, logos, or with another customized image file in a different position, to create a customized composite image containing one or more pieces of customer information specific to each record, using methods described above. As discussed previously, other imaging techniques, such as Infinidepth® can be used to form the customized composite image in place of or in combination with traditional interlacing.

Figure 6A:
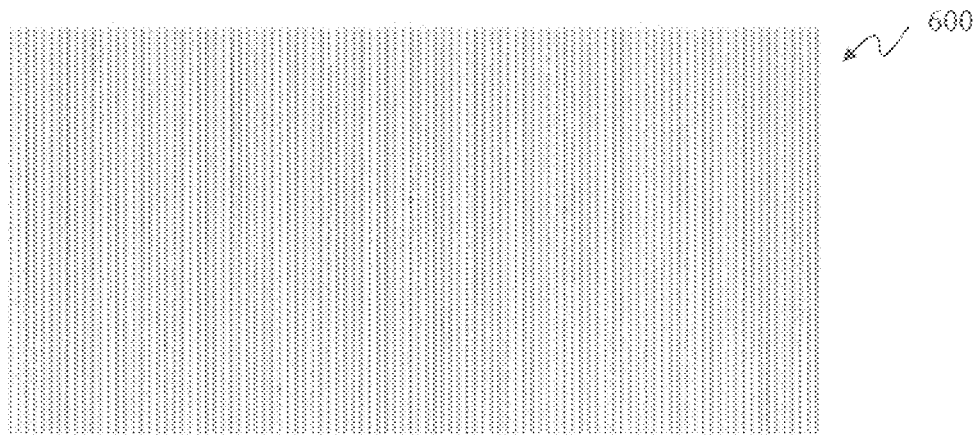
FIGS. 6A-6E are plan views of different layers and assemblies of a louvered or transparent interlaced image layer assembly according to an embodiment of the invention.
Figure 6B:
Figure 6C:
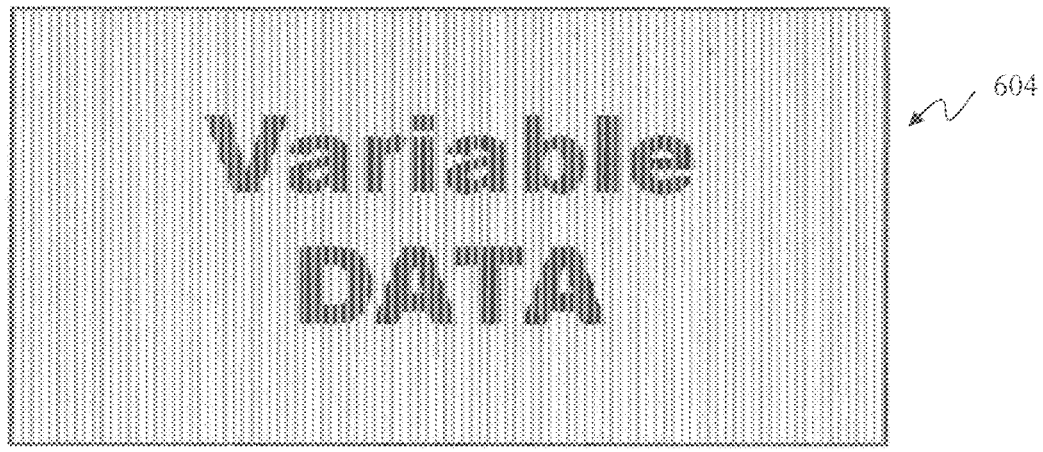
Figure 6D:
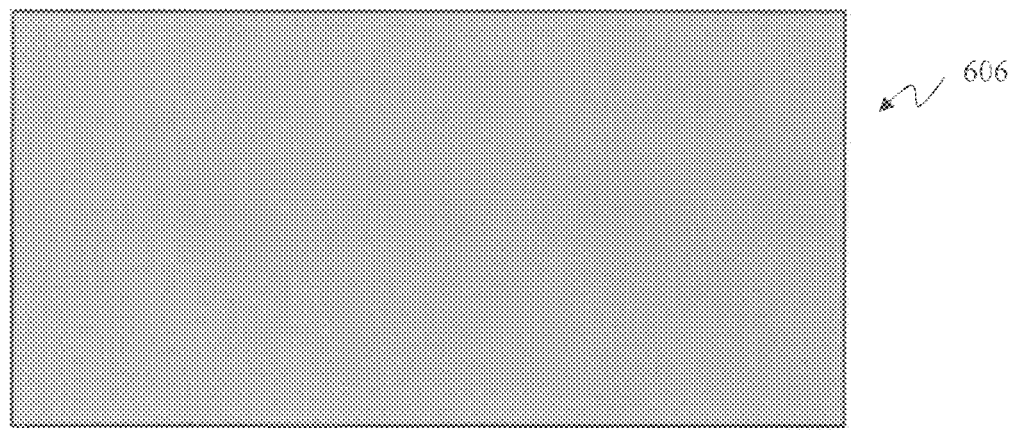
Figure 6E:
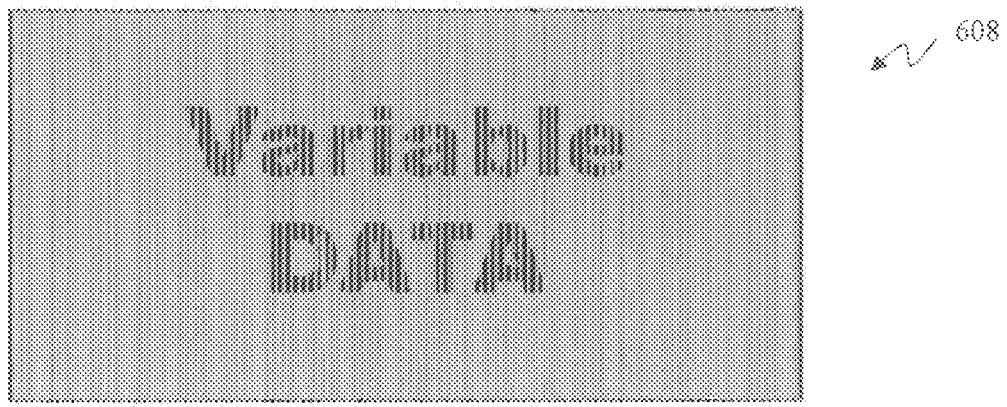

Alternatively, referring to FIGS. 6A-6E, each name is imposed or inserted as a text string between a "louvered" or transparent interlaced image layer and another phase absent or displaced from the transparent interlaced file, forming a layered variable data assembly. Referring to FIG. 6A, a louvered or transparent interlaced image layer assembly 600 includes a shaded or green area representing foreground image(s) that are interlaced, and a non-shaded or white area that represents a transparent area. An image layer, shown at 602 in FIG. 6B can comprise variable data in the form of images, graphics, objects, text, and the like. Image layer 602 is layered beneath the shaded or green area and is visible through the shaded area, to form layered variable data assembly 604 as shown in FIG. 6C. The louvered interlaced image layer is essentially on top of the variable data image layer, masking out a portion of the variable data without interlacing it. Referring to FIG. 6D, an optional backing 606 layer that does not need to be interlaced can also be included to fill in the gaps of the transparent layer. This layered assembly 608 with backing layer is illustrated in FIG. 6E.

Referring back to FIGS. 4 and 5, the text or font of the variable data is kept in traditional format, i.e. not an image file, such as a text string, so as to keep the files small and process very fast. Once the customized composite image is formed in 407, it is then automatically inserted at 408 into a pre-designated field of the digital template using imposition systems and methods discussed above.

Optionally, additional static or variable customer information is automatically or manually inserted into one or more fields on the front and/or back of the template, without the need for the operator to manually insert the variable data.

Once the customized composite image is inserted into the digital template, the combination is automatically saved as a form file in a suitable format, such as a JPEG, GIFF, PDF, or the like. This form file is then automatically converted to a page description language (PDL), for example, by sending it through a raster image processor (RIP) to generate a print ready file in digital format that can be accepted by a print device. Other PDLs can be contemplated, such as, for example, PCL (printer control language) and HPGL (Hewlett-Packard Graphics Language). Alternatively, certain print devices do not require this conversion to a RIP file or other PDL file and are print-ready without the conversion.

The print ready file is then communicated to a print device at 410, similar to the method of FIG. 1. In one embodiment, it is automatically routed to a factory interface and entered into the queue for printing. An operator selects a batch of print ready files from a terminal and sends it to the print device through a communication bus. The print ready file is then printed on a substrate. Additionally, the opposite side of the substrate, i.e. the side without the composite image, can be digitally printed with static and/or variable text, graphics, logos, opaque backing layers, and any of a variety of indicia. Optional human- or machine-readable indicia can also be added to this backside including magnetic stripes, bar codes, QR codes, codes, and the like, or combinations thereof. An optional protective coating or laminate can cover at least a portion of the additional optional indicia.

The printed sheets or rolled web, if not printed directly on a lens, is then laminated or otherwise mounted to an unprinted lens at 412, such that the customized composite image is viewable through the lens and the desired effect is achieved. The lens is registered to the printed substrate using registration techniques known to one of ordinary skill in the art.

The mounting can be accomplished by any of a variety of nipping, compression and heat lamination, cold lamination, or any of a variety of lamination techniques, as discussed in the method of FIG. 1.

In an alternative embodiment of the invention, the substrate is a clear material, such as a transparent or translucent plastic material. The substrate is printed on a first side of the substrate, and the lens array is embossed with heat and pressure on at least a portion of second side of the substrate such that the customized composite image is viewable through the clear material and the lens array.

In yet another embodiment of the invention, the substrate is a clear material, such as a transparent or translucent plastic material. The substrate is printed on a first side and/or a second side, and a lens array is printed on the first side of the substrate covering the composite image such that the composite image is viewable through the lens array. Alternatively, the substrate is opaque and is printed with the composite image on the first side. The lens array is then printed over the composite image on the first side such that the composite image is viewable through the lens array.

The bonded printed sheets then continue to optional converting 414, as in the method of FIG. 1. For example, if multiple print files are printed on the substrate, the substrate is converted into a plurality of articles. Similarly, if multiple print batches are printed on a single substrate, the substrate is converted. Any of a number of suitable converting techniques can be utilized, such as, for example, guillotine, rotary converting, laser converting, and the like.

The converted articles or pieces are then mailed at 416 to each targeted recipient in the previously-supplied database or customer list. A message or file is then automatically and electronically sent to the server at 418 indicating that the print project, and therefore the order is complete.

Figure 5:
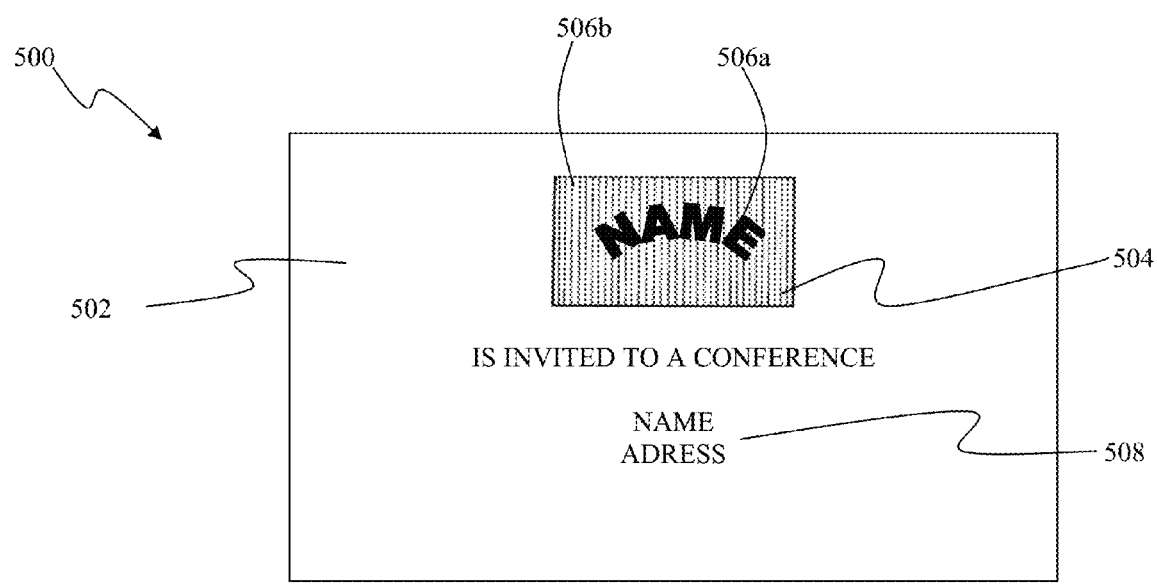
FIG. 5 is a top view of a mass customization article created using the method according to FIG. 4.

A customized lenticular article made using the method of FIG. 4 is illustrated in FIG. 5. Article 500 comprises a background template 502 having one or more customized composite images 504 including, for example, interlaced segments of customer information 506a and a second image 506b. It is also contemplated that more than two images can be interlaced. Background template 502 can be either of a static design, or can contain predefined dimensionally imaged effects, such as animation, magnification, 3D text, graphics, and/or logos, and the like.

Article 500 can further comprise static text or graphics 508 placed specific to the targeted recipient either in pre-designated fields or anywhere on front and/or back of template 502, and can optionally be placed in a front template so that the text can be placed over at least a portion of customized composite image 504.

The systems and methods of the present invention allow for customized dimensionally imaged articles to be efficiently and economically produced. The systems and methods require little operator interaction, and allow for automatic generation of a digital proof, automatic interlacing of the customized or personalized data such as images, automatic insertion of the customized information and images into the digital template, and/or automatic packaging and mailing. The systems and methods result in the ability to run either small or large orders of customized lenticular or other dimensionally imaged pieces, with quick turn-around from order submission to completion, and preferably within three days. The result is high-quality, eye-catching customized articles or pieces.

The invention may be embodied in other specific forms without departing from the essential attributes thereof; therefore, the illustrated embodiments should be considered in all respects as illustrative and not restrictive.

What is claimed is:

1. A system for customizing articles having one or more visual effects formed from a customized composite image and a lens array, the articles including variable data, the system comprising:
    a production site adapted to—
        receive a digital data file containing a variable data set, each piece of data of the variable data set being different from another piece,
        combine at least some individual pieces of the variable data set with an image file or text file to form the customized composite image, the customized composite image being adapted to produce a visual effect when coupled with the lens array, wherein the customized composite image comprises a transparent image layer overlaying an individual piece of the variable data set, the transparent image layer being formed of the image file or text file interlaced with a transparent area, and wherein the individual pieces of variable data are viewable through the transparent area of the transparent image layer,
        insert the customized composite image into a field of a digital template to form a final digital print file, and
        provide a virtual representation of the customized composite image either alone or within the digital template, wherein the virtual representation comprises an animated image format representing the one or more visual effects; and
    a digital printing device, wherein the printing device communicates with the production site to print the final digital print file on a substrate, wherein the printed substrate is coupled to the lens array or includes the lens array defined thereon such that the customized composite image is viewable through the lens array, thereby producing the one or more visual effects.

2. The system of claim 1, wherein one or more individual pieces of variable data are converted to a text string, wherein each text string is combined with an interlaced image in a layered template to form the customized composite image.

3. The system of claim 2, wherein the variable data set of the digital data file comprises a set of targeted recipient names for mass distribution of a mail piece, and wherein at least some of the names are converted to individual text strings.

4. The system of claim 1, wherein the digital data file is provided to the production site through a user interface, email, a storage device, or combinations thereof.

5. The system of claim 1, wherein the variable data set comprises a series of elements activated by logic, and wherein the variable data defines whether an element of the series of elements is to be used for customizing a particular article.

6. The system of claim 1, wherein the substrate comprises a lens sheet comprising a first surface including the lens array defined thereon, and a second generally planar surface, and wherein the final digital print file is printed on the second generally planar surface of the substrate.

7. The system of claim 1, wherein a lens sheet having the lens array defined thereon is bonded to the printed substrate such that the customized composite image is viewable through the lens sheet, thereby forming a customized dimensionally imaged article.

8. The system of claim 1, wherein the substrate comprises a clear material, wherein the final digital print file is printed on a first side of the substrate, and wherein the lens array is printed on at least a portion of a second side of the substrate such that the customized composite image is viewable through the clear material and the lens array.

9. The system of claim 1, wherein the final print file is printed on a first side of the substrate thereby forming a first print layer, and the lens array is printed on at least a portion of the first side over the first print layer such that the customized composite image is viewable through the lens array.

10. The system of claim 1, wherein the one or more visual effects comprise three-dimensional effects, animation, magnification, or combinations thereof.

11. The system of claim 1, wherein the substrate comprises a clear material, wherein the final digital print file is printed on a first side of the substrate, and wherein the lens array is embossed with heat and pressure on at least a portion of a second side of the substrate such that the customized composite image is viewable through the clear material and the lens array.

12. A system for customizing articles having a visual effect formed from a customized composite image and a lens array, the system comprising:
    a production site adapted to—
        receive a digital data file containing a first custom image,
        combine the custom image with at least a second image to form the customized composite image, wherein the customized composite image comprises a transparent image layer overlaying the first custom image, the transparent image layer being formed of the at least second image interlaced with a transparent area, and wherein the first custom image is viewable through the transparent area of the transparent image layer, the customized composite image being adapted to produce the visual effect when coupled with the lens array,
        insert the customized composite image into a field of a digital template to form a final digital print file, and
        provide a virtual representation of the customized composite image either alone or within the digital template, wherein the virtual representation comprises an animated image format representing the visual effect; and a digital printing device, wherein the printing device communicates with the production site to print the final digital print file on a substrate, wherein the printed substrate is coupled to the lens array or includes the lens array defined thereon such that the customized composite image is viewable through the lens array, thereby producing the visual effect for each article.

13. The system of claim 12, wherein the at least second image comprises a second custom image.

14. The system of claim 12, wherein the at least second image comprises one or more stock graphics, one or more custom images, or both, thereby forming the customized composite image.

15. The system of claim 12, wherein the digital data file is provided to the production site through a user interface, email, a storage device, or combinations thereof.

16. The system of claim 12, wherein the articles comprise containers, cups, packaging, wrappers, tubes, envelopes, announcements, portfolios, multimedia packaging, folders, greeting cards, invitations, napkins, posters, business cards, fabrics, clothing, billboards, stickers, labels, badges, pens, magnets, postcards, transaction cards, gift cards, loyalty cards, reward cards, phone cards, identification cards, or combinations thereof.

17. The system of claim 12, wherein the substrate comprises a lens sheet comprising a first surface including the lens array defined thereon, and a second generally planar surface, and wherein the final digital print file is printed on the second surface.

18. The system of claim 12, wherein a lens sheet having the lens array defined thereon is bonded to the printed substrate such that the customized composite image is viewable through the lens sheet, thereby forming a customized dimensionally imaged article.

19. The system of claim 12, wherein the substrate comprises a clear material, wherein the final digital print file is printed on a first side of the substrate, and wherein the lens array is printed on at least a portion of a second side of the substrate such that the customized composite image is viewable through the clear material and the lens array.

20. The system of claim 12, wherein the final print file is printed on a first side of the substrate thereby forming a first print layer, and the lens array is printed on at least a portion of the first side over the first print layer such that the customized composite image is viewable through the lens array.

21. The system of claim 12, wherein the substrate comprises a clear material, wherein the final digital print file is printed on a first side of the substrate, and wherein the lens array is embossed with heat and pressure on at least a portion of a second side of the substrate such that the customized composite image is viewable through the clear material and the lens array.

22. The system of claim 12, wherein the visual effect comprises three-dimensional effects, animation, magnification, or combinations thereof.

23. A system for ordering customized articles having a customized visual effect formed from a customized composite image and a lens array, the system comprising:
(A) a host site accessible on a browser from a user device, the host site being adapted to—
  prompt a user to supply a digital image file containing a digital image to be digitally combined with a second image to form the customized composite image, the customized composite image being adapted to produce the customized visual effect when coupled with the lens array,
  display to the user a virtual representation of the customized composite image and the customized visual effect, wherein the virtual representation comprises an animated image format for representing the customized visual effect,
  prompt the user to approve or edit the digital representation, and
  prompt the user to submit an order for one or more of the articles upon approval of the digital representation, wherein upon submission of the order, the host site transmits, over a network, the order including the digital image file;
(B) a production site, the production site being adapted to—
  receive the order including the digital image file,
  form the customized composite image by overlaying the digital image with a transparent image layer to form the customized composite image, wherein the transparent image layer comprises the second image interlaced with a transparent area, and wherein the digital image is viewable through the transparent area of the transparent image layer,
  digitally insert the customized composite image into a digital template based on a coordinate corresponding to the digital template to produce a final digital print file representing the customized composite image inserted into the template; and
(C) means for communicating the final digital print file to a printing device or engine to print the final digital print file on a substrate, wherein the printed substrate is coupled to the lens array or includes the lens array defined thereon such that the customized composite image is viewable through the lens array, thereby producing the customized visual effect.

24. The system of claim 23, wherein the virtual representation is updated upon editing by the user.

25. The system of claim 23, wherein upon submission of the order, the host site transmits the digital image file in a compressed format, and wherein upon receipt of the order by the production site, the digital image is extracted from the digital image file without loss of resolution.

26. The system of claim 23, wherein the digital template is designed by the user on the host site.

27. The system of claim 23, wherein the host site provides a plurality of digital templates, and wherein the host site is adapted to prompt the user to select a digital template from the plurality of digital templates.

28. A system for customizing articles having a visual effect formed from a customized composite image and a lens array, the system comprising:
a production site adapted to—
  receive a digital customized composite image file containing a first custom image combined with at least a second image thereby defining a customized composite image, wherein the customized composite image comprises a transparent image layer overlaying the first custom image, the transparent image layer being formed of the at least second image interlaced with a transparent area, and wherein the first custom image is viewable through the transparent area of the transparent image layer, the customized composite image being adapted to produce the visual effect when coupled with the lens array,
  insert the customized composite image into a field of a digital template to form a final digital print file, and
  provide a virtual representation of the customized composite image either alone or within the digital template, wherein the virtual representation comprises an animated image format representing the visual effect; and a digital printing device, wherein the printing device communicates with the production site to print the final digital print file on a substrate, wherein the printed substrate is coupled to the lens array or includes the lens array defined thereon such that the customized composite image is viewable through the lens array, thereby producing the visual effect for each article.

29. A system for ordering customized articles having a customized visual effect formed from a customized composite image and a lens array, the system comprising:

(A) a mobile application accessible on a mobile user device, the mobile application being adapted to— prompt a user to supply a digital image from the mobile user device, the digital image being selected to be digitally combined with a second image to form the customized composite image, the customized composite image being adapted to produce the customized visual effect when coupled with the lens array, display to the user a virtual representation of the customized composite image and the customized visual effect, wherein the virtual representation comprises an animated image format for representing the customized visual effect, prompt the user to approve or edit the digital representation, and prompt the user to submit an order for one or more of the articles upon approval of the digital representation, wherein upon submission of the order, the mobile application transmits, over a network, the order including the digital image file;

(B) a production site, the production site being adapted to— receive the order including the digital image file, form the customized composite image by overlaying the digital image with a transparent image layer, wherein the transparent image layer comprises the seond image interlaced with a transparent area, and wherein the digital image is a viewable through the transparent area of the transparent image layer, digitally insert the customized composite image into a digital template based on a coordinate corresponding to the digital template to produce a final digital print file representing the customized composite image inserted into the template; and (C) means for communicating the final digital print file to a printing device or engine to print the final digital print file on a substrate, wherein the printed substrate is coupled to the lens array or includes the lens array defined thereon such that the customized composite image is viewable through the lens array, thereby producing the customized visual effect.

30. The system of claim 29, wherein the second image comprises a second digital image from the mobile user device.

31. The system of claim 29, wherein the second image comprises a stock image from the production site.

* * * * *